(No Model.)
S. REID & J. C. THAYER.
SPIRIT LEVEL.
No. 334,052. Patented Jan. 12, 1886.
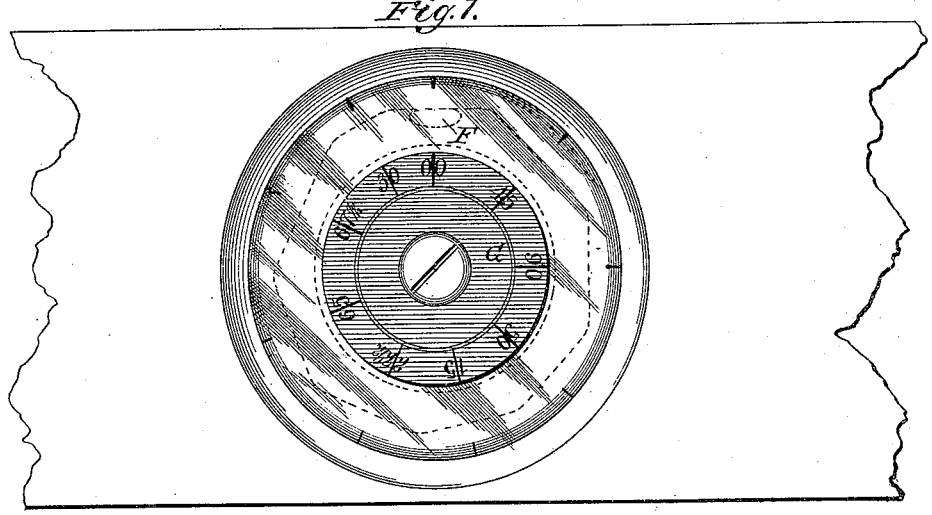
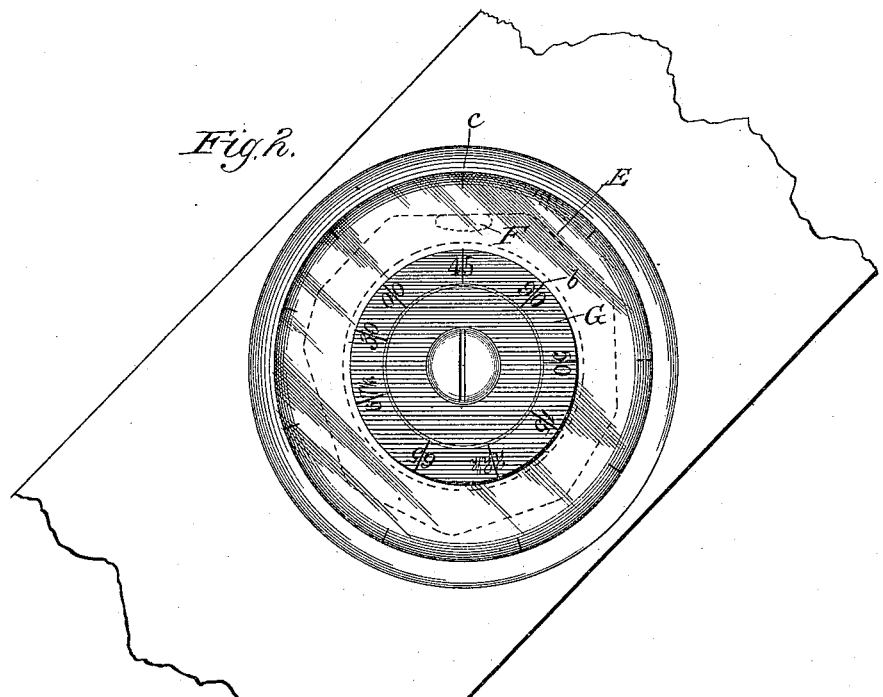
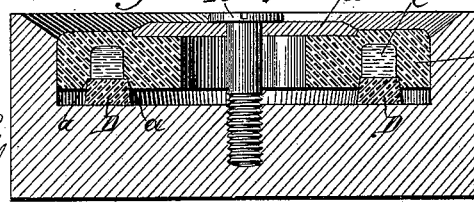

UNITED STATES PATENT OFFICE.

SAMUEL REID AND JOHN C. THAYER, OF CHICAGO, ILLINOIS; SAID REID ASSIGNOR TO SAID THAYER.

SPIRIT-LEVEL.

SPECIFICATION forming part of Letters Patent No. 334,052, dated January 12, 1886.

Application filed March 30, 1885. Serial No. 160,692. (No model.)

*To all whom it may concern:*

Be it known that we, SAMUEL REID and JOHN C. THAYER, respectively a subject of the Queen of Great Britain and a citizen of the United States, both residing in Chicago, county of Cook, and State of Illinois, have invented certain new and useful Improvements in Spirit-Levels, of which the following is a specification.

This invention relates to improvements in spirit-levels heretofore necessarily combined with mechanical devices for and intended to indicate angles varying from those indicated by the ordinary level.

The objects of this invention are to dispense with said mechanical devices, which, owing to friction, gravity, &c., are at best uncertain, and produce a level which shall determine and indicate any desired angle between zero and ninety degrees accurately, and with an absolute certainty only obtainable by the employment of a medium of maximum sensitiveness to gravitation.

Further objects are to render a level convenient of construction, manipulation, and durable by devices hereinafter described, and illustrated in the accompanying drawings, in which—

Figure 1 represents a face view of a level embodying our invention, the contour of the spirit-containing chamber and the air-bubble being indicated by broken lines; Fig. 2, a similar view with the level at a different angle, for illustrating how varying angles are determined and indicated; Fig. 3, a central vertical section on a line transverse to the length of the level.

Similar letters of reference indicate the same parts in the several figures of the drawings.

The stock A is of the usual form, and may be of any material commonly employed for ordinary spirit-levels. Centrally of its length and in one side thereof the stock is recessed or mortised to receive a glass ring, B, provided with a continuous annular groove, C, opening upon the under side of the ring, and when in use closed by a rubber ring or stopper, D, which seats against shoulders $a\ a$, formed in the ring and limiting its entrance to the groove, and supported by the bottom of the mortise in the stock. The annular groove in the ring in connection with the stopper forms a closed and continuous chamber for the spirits; but the same end may be attained without a departure from our invention by closing the under side of the chamber in any other suitable manner—as, for example, by forming the chamber wholly within the glass ring—and providing a suitable aperture for introducing the spirits, or by forming in metal a passage open upon its upper side and sealed by a plate of glass laid over the same, which glass may be of disk or ring form; but the construction shown is preferred, because of its durability and simplicity. The outer wall of the chamber C is polygonal, as shown at E, each side of which polygon, with reference to any given line, indicates a differing angle, and there may be as many of these sides as are necessary to indicate any desired number of varying angles. As shown, the inner wall is circular, but this also may, if desired, be made polygonal, so that the opposing sides of both walls will be parallel to each other; but this, however, is unnecessary, for, as indicated by the broken lines in Figs. 1 and 2, the bubble F, when the passage is filled with spirits and the level is in use, will be located next the outer wall. From this construction it will be seen that any angle may be determined by holding the stock in such a position as will locate the bubble centrally the length of that angle, as indicated by the corresponding one of the polygonal sides of the spirit-containing chamber.

To indicate at a glance any particular or desired angle which the level is adapted to determine, a plate, G, closing the central opening of the glass ring, and provided with scale-marks $b$, arranged and numbered to correspond with the angles of the polygonal sides of the spirit-chamber, is employed. To secure this plate in position, it is recessed in the glass ring, and a bolt, H, passing through it and through the ring, and screwed into the stock, serves to clamp the plate or disk upon the ring, confine the ring in the mortise, and tighten and hold the stopper in the annular chamber of the ring. The scale-marks on the plate are on lines bisecting the center of length of each side of the polygonal wall of the spirit-chamber and radial to the axis of the ring, and, for the purpose of promoting rapidity of the indications, are used in connection with similar and opposing though not necessarily numbered scale-marks *c* on the ring beyond the spirit-chamber.

The angles we have illustrated in disclosing our invention are only the more important ones; but our invention includes any number and variety of angles that may be required or desired.

The operation of our invention may be fully understood from Figs. 1 and 2, in the first of which a level line is determined, and is indicated by the bubble, being centrally bisected by the opposing scale-marks, numbered accordingly, while in the second instance the angle of forty-five degrees, in which the level is shown, is likewise indicated, and so any other of the angles indicated by the polygonal wall of the spirit-chamber may be determined and indicated.

It should be observed that within certain limits the relative arrangement of the angles formed by the polygonal sides of the spirit-chamber is of importance in securing a positive and prompt response of the bubble in shifting from one angle to another, which it would not do successfully if two angles closely approaching each other were adjacent. This objection, however, may be avoided by locating the angles nearest each other in direction on opposite sides of the spirit-chamber—as, for example, zero or the horizontal side should have arranged approximately opposite the next nearest angle the mark which, in the present instance is the angle of fifteen degrees, after which the other angles may be distributed for best attaining a like end, though the identical arrangement shown, where substantially the same number and kind of angles are used, is found to produce the best results in promoting a quick response and accurateness on the part of the bubble. It should also be observed that by having the outer wall of the spirit-chamber polygonal all of the sides of the polygon are in planes on lines tangential to the radius of a circle, and as a result the air-bubble must move in a straight line in which direction it is most sensitive to the changes in the level.

Having described our invention, what we claim, and desire to secure by Letters Patent, is—

1. In a spirit-level, a continuous spirit-chamber, the outer wall of which is polygonal, substantially as described.

2. In a spirit-level, a glass ring provided with a continuous spirit-holding chamber, the outer wall of which is polygonal, substantially as described.

3. In a spirit-level, the combination, with the glass ring, provided with a continuous groove on its under side, of an annular stopper for closing the outer portion of said groove, substantially as described.

4. The annular spirit-chamber, in combination with the scale-plate arranged within the circle of said chamber, substantially as described.

5. The glass ring, the continuous spirit-chamber thereof, the stopper, and a base-support therefor, in combination with a plate mounted upon the ring and a screw-bolt passing through said plate, and tightening said plate upon the ring, and locking the stopper in the spirit-chamber of the ring, substantially as described.

6. In a spirit-level, a continuous spirit-chamber, the outer wall of which is polygonal and each side of said polygon is perpendicular to the line drawn from the middle thereof to the center of the circle forming the inner wall of said spirit-chamber, substantially as described.

7. In a spirit-level, a spirit-chamber, the outer polygonal wall of which is so constructed that the sides which make with the edge of the stock the angles which are nearest in value shall be arranged approximately opposite each other, substantially as described.

8. In a spirit-level, an annular spirit-chamber provided with a polygonal outer wall, in combination with scale-marks on the outer and inner sides of said chamber, said scale-marks registering with each other on a line at a right angle to and through the center of length of each side of said polygon, substantially as described.

SAMUEL REID.
JOHN C. THAYER.

Witnesses:
W. W. ELLIOTT,
WILL R. OMOHUNDRO.